Oct. 19, 1937.  M. P. DE MOTTE  2,096,671

PRESSURE RESPONSIVE DEVICE

Filed May 23, 1933

INVENTOR
MAURICE P DE MOTTE
BY
Charles C. Scheffler
ATTORNEY

UNITED STATES PATENT OFFICE 2,096,671

PRESSURE RESPONSIVE DEVICE

Maurice P. De Motte, Indianapolis, Ind., assignor, by mesne assignments, to Union Carbide and Carbon Corporation, a corporation of New York Application May 23, 1933, Serial No. 672,440

9 Claims. (Cl. 137—156)

This invention relates to pressure responsive devices, such as spring controlled regulators, and more particularly to an improved pressure responsive device or regulator having a spring therein compressed to a small fraction of its free length and retained in said compressed condition.

Heretofore regulators of the diaphragm type, having a compressed spring bearing against the diaphragm for regulating either gaseous pressure or a control mechanism, have been slow to respond, especially when operating under relatively high pressures. Springs strong enough to furnish the requisite counter pressure have been short and heavy in order to allow replacement or repair and ease of assembly. Such springs are not sensitive to quick changes in load or pressure on the diaphragm because of their stiffness and for that reason have not been found to be entirely satisfactory.

An object of this invention is to provide a pressure responsive device or regulator having a spring retained in a compressed, workable position at all times in order to facilitate assembly and replacement.

Another object of this invention is to provide a spring retaining device suitable for use in mechanisms requiring controlling springs having a free length much greater than their working length and being sensitive to very slight pressure changes.

Figure 1:
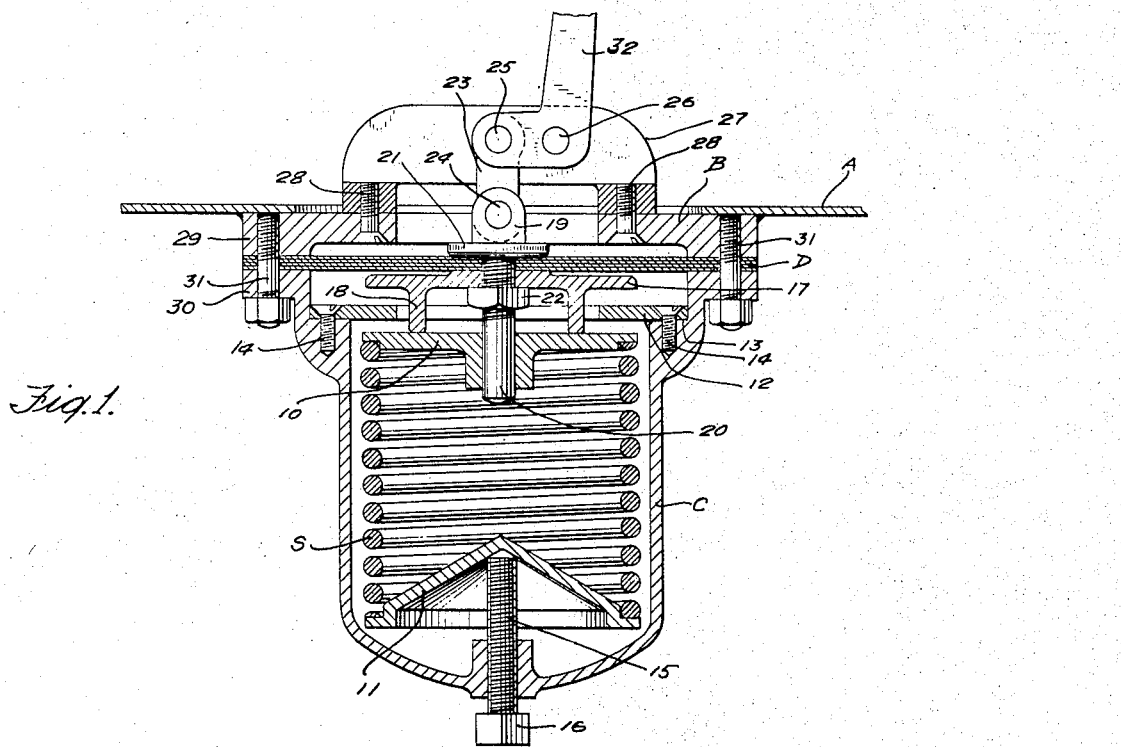
Figure 2:
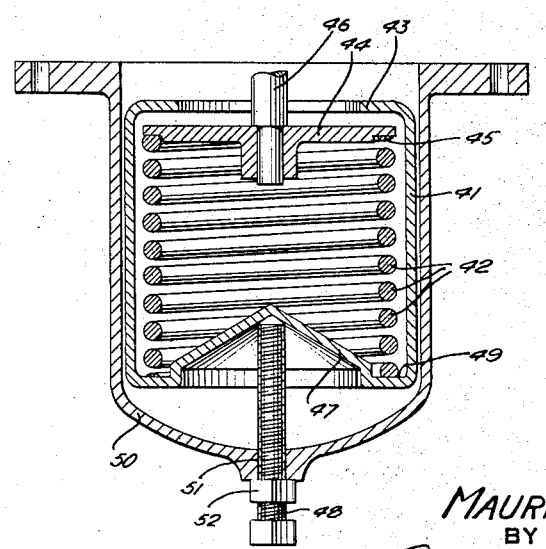

These and other objects together with the novel features of this invention will be more evident from the following description and accompanying drawing, of which Fig. 1 is a sectional view of a pressure responsive device, including a spring and diaphragm assembly and embodying one form of this invention; and Fig. 2 is a sectional view of an alternative form of spring retaining device.

A pressure responsive device embodying this invention may include a diaphragm D which is subject to and operable under the effects of pressure within a body or casing A of apparatus containing a fluid under pressure. The diaphragm D is clamped around its peripheral edge between an annular member B, attached to the casing A, and a cap or housing C, within the latter of which a helical spring S is retained in compressed condition in a space much shorter than, or a fraction of, its free length.

The coiled or helical spring S is preferably initially compressed between a flat surfaced plate 10 and a conical plate 11 by a suitable press (not shown). The spring may then be retained in its compressed condition by a retaining ring 12, which is held against a shoulder 13 in the cap C by screws 14 so that the inner edge thereof will act as a stop to check the movement of the plate 10 when the spring S is expanded against minimum pressure in the casing A and on the diaphragm D. In order to allow adjustment or setting of the working length of the spring S and to center the spring, the outer plate 11 is made conical in form, the concave side of the plate receiving the end of a screw 15 under the apex of the cone. The screw 15 is threadedly supported in the end of the cap C and has a conveniently shaped head 16 for changing the position of the screw. Both the inner and outer plates 10 and 11 may have shoulders adjacent the marginal edges for receiving and retaining the respective ends of the spring without slippage.

The inner plate 10 may be provided with any convenient diaphragm bearing guide. One of such guides, as shown in the lever operating mechanism of Fig. 1, may comprise a disc 17 having a flat area bearing against the diaphragm D and having a rim 18 which passes through the central space in the retaining ring 12 and rests on the spring plate 10. A yoke 19 which forms a part of the lever may have a shank 20 centered in an aperture in the diaphragm D and threadedly secured in a drilling in the disc 17. The yoke 19 is provided with an enlarged shoulder 21 bearing against the inside of the diaphragm D so that when a nut 22 is tightened on the shank outside the disc 17, the diaphragm, disc and yoke are all brought into rigid connection and move cooperatively in response to pressure within the casing A or to counter pressure of the spring S. The end of the shank 20 fits within an opening in the plate 10 and centers this plate together with the spring S in the cap C.

The yoke 19 may be connected with a lever 32 in any convenient manner so as to transmit movement of the diaphragm to the lever for operating a valve or other control device (not shown). A preferred lever mounting comprises a link 23 joining the yoke 19 and the lever 32 at pivotal points 24 and 25 respectively. The lever 32 may be additionally pivoted at 26 where it is rockably supported between the sides of a cradle member 27, one side of which appears in Fig. 1. The cradle member 27 is preferably held in position by screws 28 threadedly secured to the member B. It will be appreciated that any axial movement of the diaphragm and yoke will be transmitted to the link and lever arm 32 so that the free end of the lever arm may be made to operate a valve or other device. The arrangement which has been described is particularly adaptable for regulator operation of a carbide generator, although it may be applied to other apparatus.

The member B may be welded or soldered to the casing A, maintaining the same in permanent position. However, it is preferred to bolt the cap C into place on the member B, and for that purpose flanges 29 and 30 are provided which clamp the outer margin of the diaphragm D tightly therebetween when brought together by bolts 31.

An alternative form of spring retainer, as shown in Fig. 2, may comprise a cylindrical clip or housing 41 enclosing a spring 42 which has been compressed to a relatively short working length by forcing the spring into the clip to a fraction of its free length and then bending over the edges 43 of the open end of the clip. Before compressing the spring 42, however, a plate 44 having a shoulder 45 is fitted into the movable end of the spring so that the end coil of the spring is held against the shoulder. In addition a moving element 46 is soldered or otherwise secured to the plate 44 and is thereby made operable with the plate against the compression of the spring. When the edges 43 of the clip 41 are bent over they serve as an effective stop for the plate 44, at all times retaining the spring within narrow limits of expansion at its working length.

The closed end of the clip 41 may be bulged upwardly at the center to form a conical portion 47 into which an adjusting screw 48 may be inserted. An annular space 49 around the upwardly deformed portion of the clip serves to center the end of the spring 42.

The clip 41 fits slidably within a cap or housing 50 which has an inner diameter slightly larger than the outer diameter of the clip, and a drilling 51 provided with threads permits the screw 48 to move the clip within the cap 50 so as to compress the spring to a greater or less extent. In order to hold the screw 48 in a given position a lock nut 52 is provided which may be tightened against the cap.

It will be appreciated that a sensitive spring retained by either of the methods described may be employed in a wide variety of ways. Besides being adaptable for use in regulators for carbide generators, similar spring assemblies may be employed in pressure regulators, in relief valves and in other apparatus in which it is advantageous to make use of the quick acting effect of a long spring compressed into a small space.

Both in assembling and in dismantling for repairs, it will be found that a spring retained as has been described is easily handled. It becomes unnecessary to recompress the spring on reassembly and the danger attached to releasing a highly compressed spring which is not permanently retained is eliminated.

Although a preferred embodiment and an alternative form of this invention have been described, it will be understood that changes may be made without departing from the scope of this invention.

I claim:

1. In a pressure responsive device, the combination of a diaphragm subject on one side thereof to fluid pressure; a cap secured against the other side of said diaphragm; a spring disposed within said cap for exerting a pressure upon said diaphragm in opposition to said fluid pressure; means for transmitting the pressure of said spring to said diaphragm; and retaining means enclosed within said cap and removable therefrom for maintaining said spring compressed to a fraction of its free length, said retaining means embracing the ends of said spring and being adapted to permit the removal of said cap from contact with said diaphragm while said spring remains compressed to a fraction of its free length.

2. In a fluid pressure responsive device, the combination of a diaphragm subject on one side thereof to the pressure of a fluid within a casing; a cap adapted to be secured against said diaphragm on the opposite side thereof; a spring disposed within said cap for exerting pressure upon said diaphragm in opposition to said fluid pressure; retaining means embracing the ends of said spring for maintaining said spring compressed to a fraction of its free length, said retaining means being enclosed within said cap and removable therefrom; and adjustable means in operative engagement with said retaining means for further compressing said spring.

3. A fluid pressure responsive device having a casing; a diaphragm secured to said casing in responsive relation to fluid pressure in said casing; a cap secured to said casing; a spring disposed within said cap for exerting a pressure upon said diaphragm in opposition to said fluid pressure; retaining means, enclosed within said cap and removable therefrom, for maintaining said spring compressed to a fraction of its free length; a pressure plate secured in said cap by said retaining means and bearing against said spring; and a pressure disc attached to said diaphragm and having a rim extending through an opening in said retaining means into operative engagement with said pressure plate and provided with means for guiding said rim with respect to said pressure plate.

4. A fluid pressure responsive device having a casing; a diaphragm secured to said casing in responsive relation to the fluid pressure in said casing; a cap secured to said casing; a spring disposed within said cap for exerting a pressure upon said diaphragm in opposition to said fluid pressure; retaining means, enclosed within said cap and removable therefrom, for maintaining said spring compressed to a fraction of its free length; a pressure plate having a centrally disposed bore and bearing against one end of said spring; and means for transmitting pressure from said plate to said diaphragm including a guiding stem adapted to slide within said bore and a rim disposed about said stem and adapted to contact said pressure plate, said stem and said rim being adapted to pass through an aperture in said retaining means.

5. A fluid pressure responsive device having a casing; a diaphragm secured to said casing in responsive relation to fluid pressure in said casing; a cap removably secured to said casing; a spring disposed within said cap for exerting a pressure upon said diaphragm in opposition to such fluid pressure; and retaining means enclosed within said cap for maintaining said spring compressed to a fraction of its free length, said retaining means comprising a pair of members embracing opposite ends of said spring, one of said members being removably secured to said cap by means independent of said casing, whereby said spring and said retaining means are removable with said cap from said casing.

6. A fluid pressure responsive device having a casing; a diaphragm secured to said casing in responsive relation to fluid pressure in said casing; a cap removably secured to said casing; a spring disposed within said cap for exerting a pressure upon said diaphragm in opposition to such fluid pressure; retaining means enclosed within said cap and removable therefrom and embracing the ends of said spring for maintaining said spring compressed to a fraction of its free length; a pressure plate for said spring secured within said cap by said retaining means; and a pressure disc for said diaphragm, said disc having a rim extending through an opening in said retaining means into operative engagement with said pressure plate, said spring and said retaining means being removable with said cap from said casing so as to remove said rim from operative engagement with said pressure plate.

7. A fluid pressure responsive device having a casing; a diaphragm adapted to be secured to said casing in responsive relation to the fluid pressure in said casing; a cap adapted to secure said diaphragm to said casing; a spring disposed within said cap and adapted to exert a pressure upon said diaphragm in opposition to said fluid pressure; a plate in operative engagement with the end of said spring adjacent said diaphragm; a second plate in operative engagement with the other end of said spring, said spring engaging plates being disposed within said cap; a plate having an aperture therethrough and disposed within said cap adjacent said diaphragm, said plate being removably secured to said cap and being adapted to contact the first of said spring engaging plates so as to maintain said spring compressed to a fraction of its free length; a pressure disc for said diaphragm having a portion thereof extending through the aperture in said retaining plate so as to operatively contact said first spring engaging plate; and adjustable means in operative engagement with the second of said spring engaging plates for further compressing said spring.

8. In a fluid pressure responsive device, the combination of a diaphragm subject on one side thereof to fluid pressure; a cap secured against said diaphragm on the other side thereof; a spring disposed within said cap and normally partially compressed; a pressure plate in operative engagement with the end of said spring adjacent said diaphragm; means for transmitting the pressure of said spring from said plate to said diaphragm, said means being disengageable from said plate; and means in operative engagement with the other end of said spring for restraining the movement of said spring and plate beyond a predetermined extent so as to maintain said spring normally partially compressed; said spring, said plate, and said restraining means being removable from said cap as a unit with said spring partially compressed.

9. In a fluid pressure responsive device, the combination of a diaphragm subject on one side thereof to the pressure of a fluid within a casing; a cap secured against said diaphragm on the other side thereof; a spring disposed within said cap for exerting pressure upon said diaphragm in opposition to said fluid pressure; and retaining means enclosed within said cap and embracing the ends of said spring for maintaining said spring compressed to a fraction of its free length, said retaining means and said spring being removable from said cap as a unit.

MAURICE P. DE MOTTE.